(12) United States Patent
Lucas

(10) Patent No.: US 8,604,986 B2
(45) Date of Patent: Dec. 10, 2013

(54) DEVICE FOR PROPAGATION OF ELECTROMAGNETIC WAVES THROUGH WATER

(75) Inventor: James Lucas, Liverpool Merseyside (GB)

(73) Assignee: James Lucas, Liverpool Merseyside (GB)

( * ) Notice: Subject to any disclaimer, the term of this patent is extended or adjusted under 35 U.S.C. 154(b) by 294 days.

(21) Appl. No.: 12/992,774

(22) PCT Filed: May 14, 2009

(86) PCT No.: PCT/GB2009/050521
§ 371 (c)(1),
(2), (4) Date: Jan. 26, 2011

(87) PCT Pub. No.: WO2009/138800
PCT Pub. Date: Nov. 19, 2009

(65) Prior Publication Data
US 2011/0163926 A1    Jul. 7, 2011

(30) Foreign Application Priority Data
May 14, 2008   (GB) .................................. 0808728.0

(51) Int. Cl.
*H01Q 1/34*   (2006.01)
(52) U.S. Cl.
USPC .......................................... 343/709; 343/719
(58) Field of Classification Search
USPC ................................................ 343/709, 719
See application file for complete search history.

(56) References Cited

U.S. PATENT DOCUMENTS

| | | | | |
|---|---|---|---|---|
| 3,788,255 A | * | 1/1974 | Tennyson | 114/20.1 |
| 4,187,489 A | * | 2/1980 | Silberg | 340/852 |
| 4,336,537 A | * | 6/1982 | Strickland | 340/850 |
| 6,854,410 B1 | * | 2/2005 | King et al. | 114/244 |
| 6,870,508 B1 | * | 3/2005 | Rivera | 343/709 |
| 7,722,774 B2 | * | 5/2010 | Bourgard et al. | 210/748.02 |
| 2006/0286931 A1 | | 12/2006 | Rhodes et al. | |
| 2008/0192576 A1 | * | 8/2008 | Vosburgh et al. | 367/134 |

FOREIGN PATENT DOCUMENTS

WO    0195529 A    12/2001

OTHER PUBLICATIONS

Shaw, A., "Experimental Investigations of Electromagnetic Wave Propagation in Seawater"; Microwave Conference 2006; 36th European IEEE, PI; Sep. 1, 2006; pp. 572-575.
International Search Report dated Aug. 19, 2009.

* cited by examiner

*Primary Examiner* — Tho G Phan
(74) *Attorney, Agent, or Firm* — Bracewell & Giuliani LLP

(57) ABSTRACT

The invention concerns a device for propagating electromagnetic waves through impure water such as seawater or brackish water. The device comprises a body of polar material, for example pure water, contained in an enclosure, and an antenna arranged to emit an electromagnetic signal into the polar material. Excitation of dipoles in the polar material by the electromagnetic signal causes them to re-radiate the signal, which is thereby emitted into and relatively efficiently propagated through the water in which the device is submerged. The device offers the possibility of improved underwater communication.

20 Claims, 2 Drawing Sheets

DEVICE FOR PROPAGATION OF ELECTROMAGNETIC WAVES THROUGH WATER

RELATED APPLICATIONS

This application is a national phase entry of PCT/GB2009/050521 which claims priority to and the benefit of GB 0808728.0 filed on May 14, 2008.

BACKGROUND OF THE INVENTION

1. Field of the Invention

The present invention relates to a device for propagation of electromagnetic waves through water.

2. Description of the Related Art

It has long been recognised that it would be very useful to be able to propagate electromagnetic waves efficiently in impure water, particularly seawater, for communications and other purposes, but doing so remains problematic. Conventional metal antennae (loop, dipole etc.) are rendered ineffective when placed in seawater and other impure water due to its electrical conductivity.

International patent application no. PCT/GBO1/02409, published under no. WO 01/95529 in the name of Qinetiq Ltd., describes an underwater communications system which uses submerged transmitter and receiver aerials coated in electrically insulating material. In tests of aerials of this general type, the present inventor has observed that the electromagnetic signal transmitted through water attenuates rapidly over a distance of perhaps a metre or two. At greater distances, signal attenuation with distance becomes much less rapid, and a detectable signal penetrates a much longer distance into the surrounding seawater, but its power represents only a small fraction of the power input to the antenna. FIG. 1 is a graph of the relevant experimental data. Rapid signal attenuation with distance is seen at short range. At a distance of just 1-2 metres, the signal is weakened by roughly 100 decibels. However a detectable (albeit weak) signal is observed at much greater distances of 90 metres and more, and the attenuation with distance at these larger distances is far less rapid.

SUMMARY OF THE INVENTION

The present inventor has arrived at an understanding of these observations. The electromagnetic signal directly emitted from the antenna attenuates rapidly, with increasing distance, due to the conductivity of the surrounding water, accounting for the rapid decline in signal strength at small distance. The more slowly attenuating lower level signal, which reaches greater distances, is created, at least in part, by re-radiation by dipoles in the water surrounding the antenna. To explain, recall first of all that water molecules possess a strong electric dipole. They are thus excited by the electromagnetic wave emitted by the antenna and oscillate in phase with it. As is well known, an oscillating dipole itself emits an electromagnetic wave. Hence the water molecules in the vicinity of the antenna absorb and coherently re-radiate the electromagnetic wave from the antenna, and it is this re-radiated wave which accounts for the relatively long range signal penetration. This has implications for antenna design.

In accordance with a first aspect of the present invention, there is provided a device for propagation of waves in impure water, the device comprising a polar medium and an antenna which is connectable to signal-generator electronics and which is arranged to emit an electromagnetic wave into the polar medium.

Dipoles in the medium re-radiate the electromagnetic radiation. When the medium is submerged in seawater or other impure water (e.g. brackish water) a relatively high proportion of the energy input to the antenna is transmitted through the impure water in the form of a penetrative electromagnetic wave.

The polar medium is distinct from the water in which the device is to be submerged and has different properties from it. The polar medium may take the form of a liquid confined in an enclosure or it may be solid. The polar medium comprises numerous electric dipoles. The electric dipoles may be molecular dipoles capable of being excited by electromagnetic radiation.

The polar medium may be a lossy dielectric. The term is well understood in the art. Loss, in this context, refers to energy loss due to generation of dipole radiation. In this respect, the "lossyness" of a dielectric material is increased with decrease in electrical conductivity.

The polar medium may therefore have an electrical conductivity less than about 0.02 Siemens per metre ($Sm^{-1}$), for example less than about 0.01 $Sm^{-1}$. The polar medium may have electrical conductivity less than about 0.0001 $Sm^{-1}$, The polar medium may be pure water. Distilled water may be used, but the polar medium may be deionised water.

The polar medium may surround the antenna.

In one embodiment of the invention, the liquid polar medium is disposed in an enclosure, the antenna being within the enclosure and submerged in the medium. The antenna may be coated with a dielectric and so electrically isolated from the polar medium.

The formation of the antenna and relationship of the antenna to the polar medium may be such that the electric field generated by the antenna is substantially confined within the polar medium.

The device may further comprise signal generator electronics for applying to the antenna a signal having a carrier frequency between about 0.5 MHz and about 1000 MHz. The carrier frequency may be between about 1 MHz and about 100 MHz, for example between about 10 MHz and about 100 MHz or between about 1 MHz and about 20 MHz. The signal generator electronics and the antenna may both be located within the polar medium, for example within the enclosure.

In accordance with a second aspect of the present invention, there is provided a method of propagating waves through impure water, comprising submerging in the impure water a body of polar material and emitting an electromagnetic signal into the polar material, causing dipoles in the polar material to re-radiate the electromagnetic signal into the impure water.

The polar material may be pure water. The polar material may be a lossy dielectric.

The polar material may be a solid or a liquid

The device may further comprise signal generator electronics for applying to the antenna a signal having a carrier frequency between about 0.5 MHz and about 1000 MHz. The carrier frequency may be between about 1 MHz and about 100 MHz, for example between about 10 MHz and about 100 MHz or between about 1 MHz and about 20 MHz. The signal generator electronics and the antenna may both be located within the polar medium, for example within the enclosure.

BRIEF DESCRIPTION OF THE DRAWINGS

At least one embodiment of the invention will now be described, by way of example only, with reference to the accompanying drawings, in which:—

DETAILED DESCRIPTION

Figure 1:
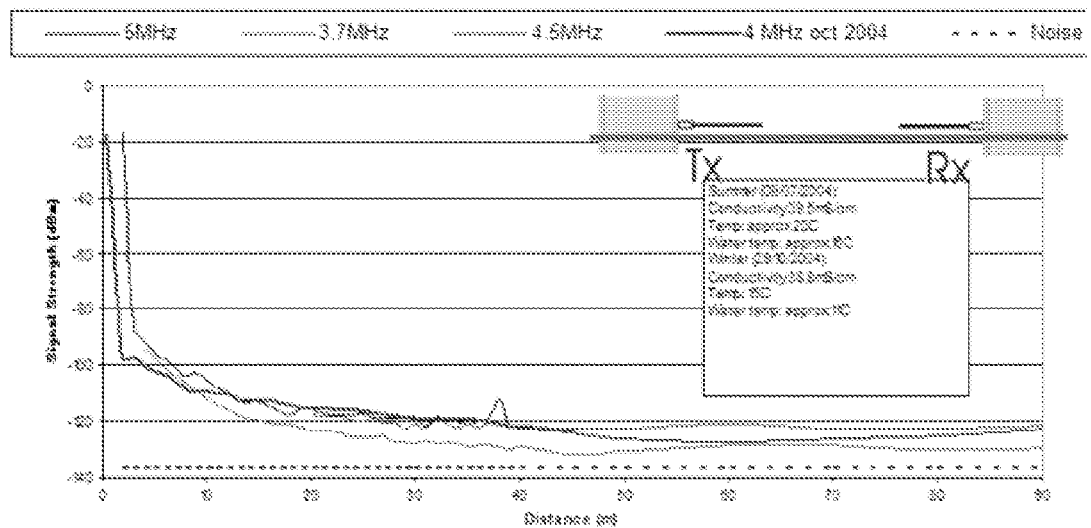
FIG. 1 is a graph of measured signal strength (vertical axis) against distance (horizontal axis) for an electromagnetic signal emitted from an insulated antenna submerged in seawater.
Figure 2:
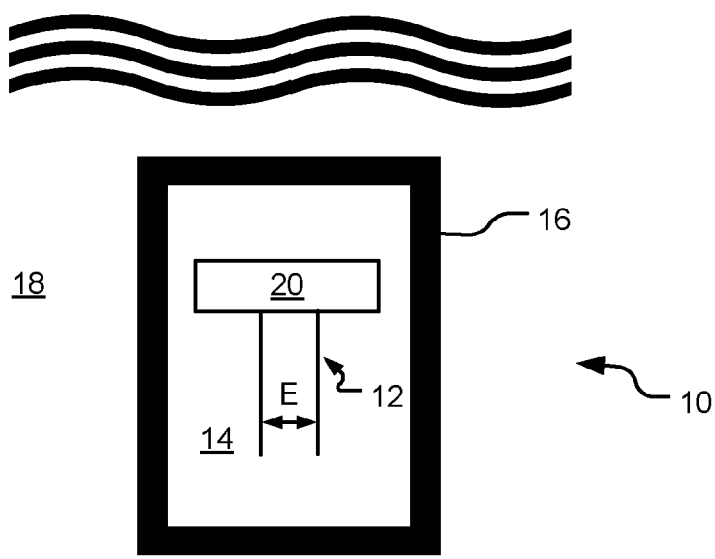
FIG. 2 is a schematic representation of a device constituting an embodiment of the invention.

Referring to FIG. 2, a device 10 comprises an electrically conductive metal antenna 12 surrounded by a polar medium 14. In this embodiment, the polar medium is pure water. Alternative materials will be considered below. The polar medium 14 is contained by an enclosure 16, which in this embodiment is a watertight barrel formed of plastics, more specifically Polyvinyl Chloride (PVC). There is only a very small loss of signal in passing through the wall of the enclosure 16, which also produces a slight beam focussing action. In this respect, the shape of the enclosure 16 is such that the shape of the enclosure 16 provides a lensing effect. In this example, the enclosure 16 is of cylindrical shape that serves as a converging lens for electromagnetic energy emitted by the antenna 12, when in use, the lensing effect having a focal point associated therewith that is determined by a diameter of the enclosure 16. The antenna 12 is formed in this example as a parallel-wire transmission line with a thin coating of dielectric by which the conductive lines are electrically insulated from the polar medium, to reduce ohmic losses. The form of the antenna is chosen to localise the electric field, E, which the antenna creates within the polar medium 14, since encroachment of the electric field into the seawater 18 surrounding the antenna gives rise to ohmic losses in the seawater and so reduces efficiency. Nevertheless antennae are, of course, known in many different forms and any suitable antenna could be used in implementing the invention. In one example, signal generator electronics 20 are connected to the antenna 12 to apply an oscillating electrical signal to the antenna 12. In this example, the oscillating electrical signal constitutes a carrier signal, which is typically modulated to encode data for transmission. Many forms of modulation are known and can be used.

In this example, the electronics are shown within the device 10 itself, housed in a water-tight box, but can instead be mounted remotely from the device 10 and electrically connected to the device 10.

In operation, the device 10 serves to propagate electromagnetic radiation through impure, electrically conductive, water such as the seawater 18 and is submerged therein when in use. Excitation of dipoles in the polar medium 14 by the oscillating field, E, from the antenna 12 causes them to re-radiate, coherently with one another, an electromagnetic wave, which is emitted to the surrounding seawater 18 and which forms the output of the device 10. In the illustrated embodiment, the re-radiating dipoles are molecular. Specifically, the re-radiating dipoles are provided by water molecules. The electrical conductivity of the polar medium 14 around the antenna is lower than that of the surrounding seawater. Consequently, ohmic losses due to the oscillating electric field created by the antenna are reduced.

The electromagnetic (EM) wave power, P, generated by an electrical source of power, $P_s$, is given by:

$$P = P_S \left( \frac{\sigma_D}{\sigma_W + \sigma_D} \right) \quad \text{(Equation 1)}$$

where $\sigma_W$=electrical conductivity of the water and $\sigma_D$=dielectric loss by the oscillating dipoles.

The value for $\sigma_D$ is given by:

$$\sigma_D = \omega \in$$

where $\omega \in''$ is the loss term of the dielectric constant, and:

$$\in = \in' + j\in''$$

In this respect, for non-lossy dielectrics, $\in = \in'$. However, where the dielectric is lossy, the component or loss term, $j\in''$, is present.

The value for $\in''$ is given by Debye's equation:

$$\varepsilon'' = (\varepsilon_0' - \varepsilon_\infty') \frac{\omega \tau}{1 + \omega^2 \tau^2}$$

where $\in'_0$ is the value of $\in'$ at low electromagnetic wave frequencies (kHz) and $\in'_\infty$, is the value at high frequencies (THz). The dipole oscillation period $\tau$ is approximately equal to $\tau$=8.2 ps but is temperature dependant and can range, for example, between about 5 ps and 15 ps for temperatures respectively between about 30° C. and about 5° C. The value of $\in'_0$ is approximately 4 and $\in'_\infty$, is approximately 81 at about 20° C. Hence, the power of electromagnetic waves generated within the seawater can be summarised as:

$$P = P_S \frac{\omega \varepsilon''}{\sigma_w + \omega \varepsilon''}$$

It will be apparent from Equation 1 that emitted power is maximised by minimising electrical conductivity of the medium 14. For water, electrical conductivity depends upon purity:

TABLE 1

Water Conductivity

| Type | $\sigma$ (Sm$^{-1}$) |
| --- | --- |
| Seawater | 4 |
| Tap water | $2 \times 10^{-2}$ |
| Distilled water | $2 \times 10^{-4}$ |
| Deionised water | $2 \times 10^{-6}$ |

In this respect, the contaminants in the water, for example salt and/or chlorine, are conductive. Hence, by minimising the contaminants in the water or other polar medium that contribute to the conductivity of the water or other polar medium, the conductivity is minimised. Hence, pure or purified water, for example by distillation or a deionisation process has a lower conductivity than unpurified tap water or seawater.

By surrounding the antenna 12 with pure water in the illustrated device, rather than seawater as in the type of arrangement taught by WO 01/95529 (supra), efficiency of electromagnetic emission is thus greatly increased. It can be calculated using equation 1:

$$P = P_S \frac{\sigma_D}{(\sigma_W + \sigma_D)} \quad \text{(Equation 2)}$$

$$P = P_S \frac{192 \times 10^{-9} f^2}{(\sigma_W + 192 \times 10^{-9} f^2)}$$

where $f$ is the EM wave propagation frequency in MHz.

Losses for different types of water are as follows.

TABLE 2

| | Emission Efficiency of the Device | | |
|---|---|---|---|
| f (MHz) | Seawater $\sigma = 4$ S/m $P/P_s$(dB) | Tap water $\sigma = 0.02$ S/m $P/P_s$(dB) | Distilled Water $\sigma = 0.0002$ S/m $P/P_s$(dB) |
| 1 | −73 | −50 | −30 |
| 10 | −53 | −30 | −10.4 |
| 20 | −47 | −24 | −5.4 |
| 30 | −43 | −20 | −3.2 |

Distilled or, better, deionised water is thus favoured for the polar medium 14. Deionised water is used in the illustrated embodiment.

The frequency of the carrier wave applied to the antenna 12 can be chosen to maximise performance and the optimal frequency is related to the intended range of the signal. As Equation 2 and Table 2 above demonstrate, the efficiency of signal emission improves as frequency increases. Higher frequencies also offer greater potential communications bandwidth. However, consideration must also be given to the rate at which the emitted signal attenuates with distance from the antenna, calculable using:

$$P_z = P \exp(-\alpha z)$$

where $\alpha$ is the attenuation coefficient using Debye's equation, P is the emitted power, and $P_z$ is the power a distance z from the device 10, and:

$$\alpha = \omega \sqrt{\mu \varepsilon'} \frac{\varepsilon''}{2\varepsilon'}$$

where $\omega = 2\pi f$, and $\mu = \mu_0$ (permeability) $= 4\pi \times 10^{-7}$ Tm/A as seawater has a relative permeability, $\mu_r$, of unity ($\gamma = \mu_r \mu_0$).

For pure water:

$$\alpha = 4.32 \times 10^{-6} f^2 (f \text{ in MHz})$$

The increase in attenuation with frequency at 100 m is given in Table 3:

TABLE 3

| | | | Signal Attenuation | | | |
|---|---|---|---|---|---|---|
| f (MHz) | λ (m) | $P_z/P$ R = 100 m | Diffusion Loss dB | $2\alpha z$ R = 100 m | Attenuation Loss dB | Total Loss dB |
| 1 | 35 | $3.06 \times 10^{-4}$ | −35 | $8.64 \times 10^{-4}$ | −0.0 | −35 |
| 10 | 3.5 | $3.06 \times 10^{-6}$ | −55 | $8.64 \times 10^{-2}$ | −0.4 | −55 |
| 20 | 1.75 | $7.66 \times 10^{-7}$ | −61 | $3.46 \times 10^{-1}$ | −1.5 | −63 |
| 30 | 1.17 | $3.40 \times 10^{-7}$ | −65 | $7.78 \times 10^{-1}$ | −3.4 | −68 |
| 100 | 0.35 | $3.06 \times 10^{-8}$ | −75 | 8.64 | −38 | −113 |

Frequencies in the MHz range are suitable. For long distance transmission frequencies of the order of 10 MHz are favoured, because although frequencies of the order of 1 MHz perform well at relatively short distances, such frequencies do not result in a sufficient level of dipole radiation being generated within the electric field of the antenna 12. For shorter distances frequencies in the range 10 to 100 MHz are preferred.

There is a further loss of signal resulting from the radial spreading of the EM power. The power emitted by a dipole antenna of length $\lambda/2$ decreases as $$\frac{1}{r^2}$$

i.e. by −6 dB each time the distance is doubled.

$$P_r = \left(\frac{\lambda}{4\pi r}\right)^2 P_t$$

where $\lambda$ = wavelength ≈ 34/$f$ with $f$ in MHz and $P_t$ = transmitted power. For $f = 10$ MHz and a distance of 100 m, $P_r/P_t = -54$ dB. This diffusion loss is given in Table 3 as a function of frequency. The total loss is the sum of the diffusion loss and the attenuation loss.

Figure 3:
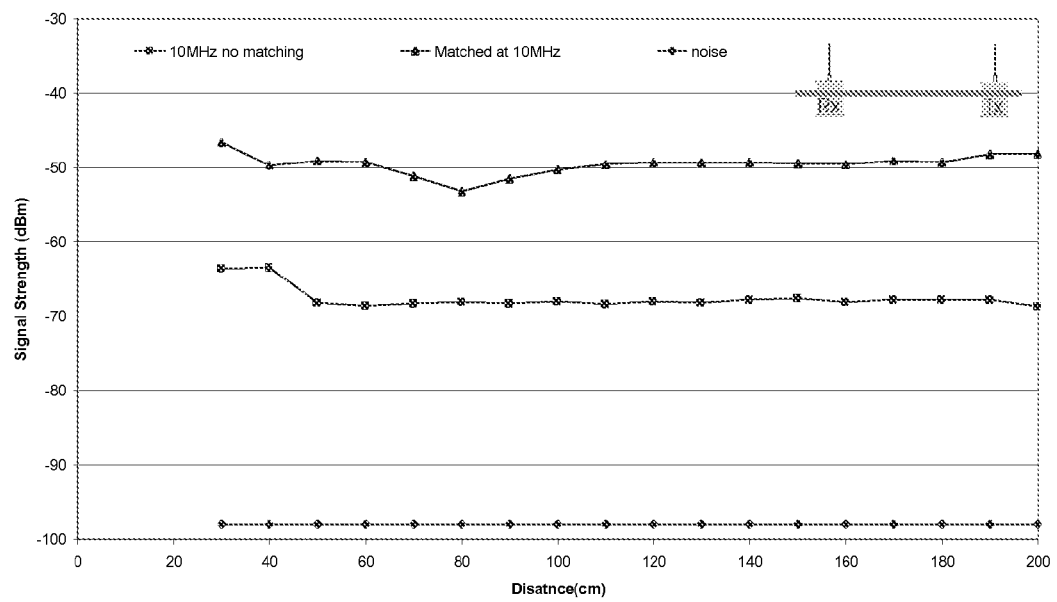
FIG. 3 is a graph of measured signal strength (vertical axis) against distance (horizontal axis) achieved using the device of FIG. 2.

For efficient generation of EM waves, it is important to carry out power matching between the source, for example the signal generator electronics 20, and the antenna. In the example of FIG. 2, the source impedance is 50Ω whilst the antenna impedance at 10 MHz is 0.04Ω. If the source is directly connected to the antenna 12, the power transferred is reduced by −10 $\log_{10}$ (50/0.05), i.e. −31 dB. By using electrical circuit matching some of this signal loss can be recovered. FIG. 3 shows measured signal strength with and without matching. The upper curve was achieved with matching and the improvement is seen to be of the order of 20 decibels. The measurements were made with a 10 MHz carrier frequency in a tank of salt water with conductivity 3.84 S/m and at about 20° C.

In another embodiment, the antenna 12 used to transmit electromagnetic signals can be part of a communications system, the communication system also comprising a receiver antenna. However, the skilled person should appreciate that the receiver antenna is separated from the transmitting antenna by the distance over which the communications signals are required to be transmitted. Although a conventional loop or dipole antenna can be used as the receiver antenna, as in the case of the antenna 12 for transmission purposes, it is necessary to produce a matching circuit in order to match the impedance of the receiver antenna to receiver electronics, for example a 50Ω receiver circuit, in respect of the transmission carrier frequency being employed.

In respect of the above-described embodiment, the polar medium 14 of the device 10 need not necessarily be water. It needs to possess lossy dipoles capable of being excited to oscillation by the antenna, and a sufficiently high dielectric constant. Suitable materials may be liquid or solid. Examples include the following.

TABLE 4

| | Some polar materials suitable for generating EM waves. | | |
|---|---|---|---|
| Name | Dielectric constant ($\varepsilon'_0$) at low frequencies | Dielectric constant ($\varepsilon'_\infty$) at high frequencies | Time constant (ps) |
| Acetone (L) | 37.4 | 1.36 | 3.3 |
| BaTiO$_3$ (S) | 1500 | 2.4 | 104 |
| CaTiO$_3$ (S) | 264 | 2.31 | 18 |
| Chlorobenzene (L) | 5.6 | 1.5 | 1.51 |
| Cyclohexanone (L) | 16.8 | 1.462 | 10.5 |
| Ethyl Benzoate (L) | 6 | 1.5 | 17.6 |
| Methyl Acetate (L) | 6.7 | 1.35 | 3.7 |
| Methyl Benzoate (L) | 6.6 | 1.516 | 13 |
| MgTiO$_3$ (S) | 13 | 2.305 | 25 |
| Nitrobenzene (L) | 39.4 | 1.55 | 13.4 |
| Nitromethane (L) | 39.4 | 1.38 | 4.4 |
| TiO$_2$ (S) | 91 | 2.55 | 25 |
| Toluene (L) | 2.4 | 1.497 | 7.6 |

L = Liquid
S = Solid

Although exemplary dielectric materials are set out above, the skilled person should appreciate that other suitable materials exist. Additionally or alternatively, the dielectric constant of the material selected can be tailored to a specific application by mixing the material with another, non-lossy, dielectric (buffer dielectric) material, for example alumina or acetone, thereby for example reducing the net dielectric constant of the selected material if used alone. Indeed, if required for certain applications, the polar material can be a solid volume of material, mixed or unmixed, such as a volume of material sufficiently large to accommodate the electric field of the antenna.

It should be appreciated that the transmitters as described herein are applicable in many fields, for example subsea activities, such as: sensing, imaging, position fixing, speed measurement, obstacle detection, guidance, communications of data, voice etc. and/or remote control.

The invention claimed is:

1. A device for propagation of waves in impure water, the device comprising:
    a submersible polar medium; and
    an antenna surrounded by the submersible polar medium, the antenna being connectable to signal-generator electronics;
    wherein the polar medium is a different material than the impure water; and
    wherein the antenna is arranged to emit an electromagnetic wave into the polar medium, thereby causing dipoles in the polar medium to re-radiate the electromagnetic wave into the impure water.

2. A device as claimed in claim 1, in which the polar medium is either a liquid confined in an enclosure or a solid or a solid confined in an enclosure.

3. A device as claimed in claim 1, in which the dipoles in the medium are molecular.

4. A device as claimed in claim 1, in which the polar medium is a lossy dielectric capable of emitting.

5. A device as claimed in claim 1, in which the polar medium has a conductivity less then about 0.01 Siemens per meter.

6. A device as claimed in claim 1, in which the polar medium is a lossy dielectric.

7. A device as claimed in claim 1, in which the polar medium is pure water.

8. A device as claimed in claim 1, in which the polar medium is a liquid and is contained in an enclosure, the antenna also being within the enclosure and being submerged in the polar medium.

9. A device as claimed in claim 8, in which the antenna is coated with a dielectric and is thereby electrically isolated from the polar medium.

10. A device as claimed in claim 1, in which the formation of the antenna and its relationship to the polar medium are such that the electric field generated by the antenna is substantially confined within the polar medium.

11. A device as claimed in claim 1, which further comprises signal generator electronics.

12. A device as claimed in claim 11, in which the signal generator electronics are arranged to provide a signal having a carrier frequency between about 0.5 MHz and about 1000 MHz.

13. A device as claimed in claim 11, in which the signal generator electronics and the antenna are both disposed within the polar medium.

14. A transmitter apparatus comprising the device as claimed in claim 1.

15. A communications system comprising the device as claimed in claim 1.

16. A method of propagating waves through impure water, the method comprising:
    submerging in the impure water a body of polar material, the polar material being a different material than the impure water; and
    emitting into the polar material an electromagnetic signal, causing dipoles in the polar material to re-radiate the electromagnetic signal into the impure water.

17. A method as claimed in claim 16, in which the polar material is pure water.

18. A method as claimed in claim 17, in which the polar material is solid.

19. A method as claimed in claim 18, in which the polar material is a liquid.

20. A method as defined in claim 16, wherein the body of polar material is contained within an enclosure, and wherein the impure water is located outside the enclosure, the method further comprising:
    positioning an antenna within the polar material contained within the enclosure;
    connecting the antenna to signal-generator electronics;
    arranging an antenna to emit the electromagnetic wave into the polar material contained within the enclosure, thereby causing the dipoles in the polar material to re-radiate the electromagnetic wave into the impure water; and
    wherein a formation of the antenna and its relationship to the polar material are such that an electric field generated by the antenna is substantially confined within the polar material contained within the enclosure.

* * * * *